(12) United States Patent
Young et al.

(10) Patent No.: US 9,954,222 B2
(45) Date of Patent: Apr. 24, 2018

(54) METAL HYDRIDE COMPOSITIONS AND LITHIUM ION BATTERIES

(71) Applicant: BASF Corporation, Florham Park, NJ (US)

(72) Inventors: Kwo Young, Troy, MI (US); Jean Nei, Southgate, MI (US)

(73) Assignee: BASF Corporation, Florham Park, NJ (US)

( * ) Notice: Subject to any disclaimer, the term of this patent is extended or adjusted under 35 U.S.C. 154(b) by 477 days.

(21) Appl. No.: 14/693,296

(22) Filed: Apr. 22, 2015

(65) Prior Publication Data

US 2016/0172669 A1    Jun. 16, 2016

Related U.S. Application Data

(60) Provisional application No. 62/071,954, filed on Dec. 10, 2014, provisional application No. 62/176,882, filed on Dec. 10, 2014.

(51) Int. Cl.
| | |
|---|---|
| *H01M 4/38* | (2006.01) |
| *H01M 4/36* | (2006.01) |
| *H01M 4/58* | (2010.01) |
| *H01M 10/0525* | (2010.01) |

(52) U.S. Cl.
CPC .......... *H01M 4/383* (2013.01); *H01M 4/362* (2013.01); *H01M 4/364* (2013.01); *H01M 4/366* (2013.01); *H01M 4/58* (2013.01); *H01M 10/0525* (2013.01)

(58) Field of Classification Search
None
See application file for complete search history.

(56) References Cited

U.S. PATENT DOCUMENTS

| | | |
|---|---|---|
| 4,200,623 A | 4/1980 | Muller et al. |
| 4,302,259 A | 11/1981 | Ward |
| 4,613,362 A | 9/1986 | Welter et al. |
| 5,024,813 A | 6/1991 | Nishiyama |
| 5,554,456 A | 9/1996 | Ovshinsky et al. |
| 5,895,518 A | 4/1999 | Guthrie et al. |
| 7,736,805 B2 | 6/2010 | Nazri et al. |
| 8,021,533 B2 | 9/2011 | Nazri et al. |
| 8,668,897 B2 | 3/2014 | Rosenband et al. |
| 2005/0126663 A1 | 6/2005 | Fetcenko et al. |
| 2008/0286652 A1* | 11/2008 | Nazri ............... H01M 4/38 429/217 |
| 2009/0130551 A1* | 5/2009 | Mori ............... C01B 3/0047 429/174 |
| 2012/0028137 A1* | 2/2012 | Chase ............... H01M 4/382 429/405 |
| 2012/0122017 A1 | 5/2012 | Mills |
| 2012/0288753 A1* | 11/2012 | Wietelmann ............ H01M 4/58 429/188 |
| 2013/0108924 A1 | 5/2013 | Nakayama et al. |
| 2013/0202969 A1 | 8/2013 | Matsunga et al. |

FOREIGN PATENT DOCUMENTS

JP    2012-094336 A    5/2012

OTHER PUBLICATIONS

English Language Abstract of JP 2012-094336 May 17, 2012.
International Search Report and written opinion dated Apr. 19, 2016.
International Preliminary Report on Patentability/written opinion dated Jun. 13, 2017.
Journal of Alloys and Compounds 253-254 (1997) 1-9, Bogdanovic, et al.
ChemComm, 2013, 49, 7174-7176, Ikeda, et al.
Nature Materials, vol. 7, Nov. 2008, 916, Oumellal, et al.
Journal of Alloys and Compounds 292 (1999) 247-252, Liang, et al.
International Journal of Hydrogen Energy 31 (2006) 1236-1240, Chen, et al.
Riso National Laboratory, Materials Research Department, 2006, Jensen, et al.

* cited by examiner

*Primary Examiner* — Scott J Chmielecki
(74) *Attorney, Agent, or Firm* — Lowenstein Sandler LLP

(57) ABSTRACT

Heterogeneous metal hydride (MH) compositions comprising a main region comprising a first metal hydride and a secondary region comprising one or more additional components selected from the group consisting of second metal hydrides, metals, metal alloys and further metal compounds are suitable as anode materials for lithium ion cells. The first metal hydride is for example $MgH_2$. Methods for preparing the composition include coating, mechanical grinding, sintering, heat treatment and quenching techniques.

23 Claims, No Drawings

METAL HYDRIDE COMPOSITIONS AND LITHIUM ION BATTERIES

GOVERNMENT SUPPORT STATEMENT

This invention was made with government support under DE-AR0000386 awarded by Advanced Research Projects Agency-Energy under the Robust Affordable Next Generation EV Storage Program (RANGE). The government has certain rights in the invention.

The present invention concerns metal hydride compositions with improved lithium absorption/desorption properties. The compositions are for example suitable for use as anodes in lithium ion batteries.

BACKGROUND OF THE INVENTION

Magnesium hydride, $MgH_2$, has been contemplated for use as an anode for lithium ion batteries. In theory, $MgH_2$ converts to Mg embedded in a LiH matrix upon charging and $MgH_2$ is reformed with release of lithium ions and electrons upon discharging. The anode stores lithium during charging. Formation of ionic compound LiH is disadvantageous as it has little or no reversibility.

SUMMARY OF THE INVENTION

The present invention addresses this problem. The invention is aimed at heterogeneous metal hydride compositions with discrete separate regions. The present compositions allow entry of lithium and suppress formation of a separate LiH phase. The present invention extends the cycle stability of the anode in a rechargeable lithium ion battery.

Disclosed is a heterogeneous metal hydride (MH) composition comprising a main region comprising a first metal hydride and a secondary region comprising one or more additional components selected from the group consisting of second metal hydrides, metals, metal alloys and further metal compounds.

Also disclosed is a rechargeable lithium ion cell comprising an anode, a cathode and an electrolyte, where the anode comprises a present metal hydride composition.

DETAILED DISCLOSURE

The metal hydrides include transition metal hydrides, rare earth metal hydrides, alkaline earth metal hydrides, alkali metal hydrides and mixed metal hydrides.

For instance, metal hydrides include $MgH_2$, NaH, $TiH_2$, $LaNi_5H_5$, $LaNi_5H_6$, $LaNi_5H_7$, $Mg_2NiH_4$, NiH, $ZrH_2$, $NaAlH_4$, $Li_3AlH_6$, $LiAlH_4$, LiH, PdH, $ZnMn_2H_3$, $CaH_2$, $YH_2$, $LiMg(AlH_4)_3$, $LiMgAlH_6$, $V_2H$, VH, FeTiH, $FeTiH_2$ and $ZrH_2$.

The metal hydrides also include hydrides of $LaNi_{4.5}Al_{0.5}$, $La_2Co_1Ni_9$, $MmNi_5$, $TiMn_2$, $YNi_5$ and $Zr_4Sc_1Fe_{10}$. The metal hydrides also include hydrides of $ZrMn_2La_{0.8}Nd_{0.2}Ni_2Co_3$, $Ti_{0.5}Zr_{0.5}Fe_{0.5}Ni_{0.5}V_{0.7}$, $MmNi_{3.7}Mn_{0.4}Al_{0.3}Co_{0.6}$, $MmNi_{3.55}Mn_{0.2}Al_{0.3}Co_{0.75}$, $Zr_{0.5}Ti_{0.5}V_{0.76}Ni_{1.48}Fe_{0.04}$, $Ti_{0.5}Zr_{0.5}Mo_{0.2}CeNi_{1.2}V_{1.8}$, $Zr_{0.9}Al_{0.1}Mn_{0.5}Cr_{0.3}Ni_{1.2}$, $Ti_{0.3}Zr_{1.0}Ni_{1.4}Cr_{0.3}$ and $Ti_{0.3}Cr_{0.3}Zr_{0.5}Ni_{0.7}V_{1.2}Cu_{0.1}$.

The metal hydrides also include hydrides of $(Mg_xNi_{1-x})_aM_b$ alloys where M is one or more elements selected from the group consisting of Ni, Co, Mn, Al, Fe, Cu, Mo, W, Cr, V, Ti, Zr, Sn, Th, Si, Zn, Li, Cd, Na, Pb, La, Mm, Pd, Pt and Ca; b is from 0 to about 30 atomic percent, a+b=100 atomic percent and x is from about 0.25 to about 0.75.

The metal hydrides also include hydrides of $ZrMn_wV_xM_yNi_z$ alloys where M is Fe or Co and w, x, y and z are molar amounts where w is from about 0.4 to about 0.8, x is from about 0.1 to about 0.3, y is from 0 to about 0.2, z is from about 1.0 to about 1.5 and w+x+y+z is from about 2.0 to about 2.4.

The metal hydrides also include hydrides of $LaNi_5$ type alloys where La and/or Ni is substituted by one or more metals selected from the group consisting of Group Ia, II, III, IV and Va metals other than lanthanides, in an atomic percent of from about 0.1 to about 25.

The metal hydrides also include hydrides of alloys of formula $TiV_{2-x}Ni_x$ where x is from about 0.2 to about 0.6.

The metal hydrides also include hydrides of alloys of formula $Ti_aZr_bNi_cCr_dM_x$ where M is one or more elements selected from the group consisting of Al, Si, V, Mn, Fe, Co, Cu, Nb, Ag and Pd, a is from about 0.1 to about 1.4, b is from about 0.1 to about 1.3, c is from about 0.25 to about 1.95, d is from about 0.1 to about 1.4, a+b+c+d=about 3 and x is from 0 to about 0.2.

The metal hydrides also include hydrides of alloys of formula $ZrMo_dNi_e$ where d is from about 0.1 to about 1.2 and e is from about 1.1 to about 2.5

The metal hydrides also include hydrides of alloys of formula $Ti_{1-x}Zr_xMn_{2-y-z}Cr_yV_z$ where x is from about 0.05 to about 0.4, y is from about 0.4 to about 1.0 and z is from 0 to about 0.4

The metal hydrides include hydrides of alloys of formula $LnM_5$ where Ln is one or more lanthanides and M is Ni and/or Co.

Metal hydrides include hydrides of alloys comprising at least one transition metal forming from about 40 to about 75 weight percent of the alloy, chosen from Groups II, IV and V of the periodic table; and at least one additional metal selected from the group consisting of Ni, Cu, Ag, Fe and Cr—Ni steel.

Mm is mischmetal, a mixture of rare earth elements. For instance, Mm is a mixture containing La, Nd and Pr, for instance containing Ce, La, Nd and Pr.

The metal hydrides also include hydrides of alloys containing Ti and Mn, hydrides of alloys containing Ti, V and Mn, hydrides of alloys containing Ti, V and Fe and hydrides of alloys containing Ti, V and Ni. Suitable alloys contain for example Ti, Zr, Mn, Cr and V; Ti, Zr, Mn, Cr and Fe; Ti, Zr, Mn, V and Mo; Ti, V and Ni; Ti, V, Ni and Zr; Ti, V, Ni and Zr; Ti, V, Ni and Cr; Ti, V, Ni and Al; or Ti, V, Zr, Ni and Cr. These alloys may contain the various metals in various atomic levels.

Metal hydrides include hydrides of alloys containing Ti, V and Mn (Ti—V—Mn alloys) and alloys containing Ti, V and Fe. For instance hydrides of alloys containing from about 31 to about 46 atomic percent Ti, from about 5 to about 33 atomic percent V and from about 36 to about 53 atomic percent Mn and/or Fe. Suitable alloys are taught for instance in U.S. Pat. No. 4,111,689.

Metal hydrides include hydrides of alloys of formula ABx where A comprises from about 50 to below 100 atome percent Ti and the remainder is Zr and/or Hf and B comprises from about 30 to below 100 atomic percent of Mn and the remainder is one or more elements selected from Cr, V, Nb, Ta, Mo, Fe, Co, Ni, Cu and rare earths and x is from about 1 to about 3. These alloys are taught for example in U.S. Pat. No. 4,160,014.

Metal hydrides include hydrides of alloys of formula $(TiV_{2-x}Ni_x)_{1-y}M_y$ where x is from about 0.2 to about 1.0 and M is Al and/or Zr; alloys of formula $Ti_{2-x}Zr_xV_{4-y}Ni_y$ where x is from 0 to about 1.5 and y is from about 0.6 to about 3.5;

and alloys of formula $Ti_{1-x}Cr_xV_{2-y}Ni_y$ where x is from 0 to about 0.75 and y is from about 0.2 to about 1.0. These alloys are disclosed for example in U.S. Pat. No. 4,551,400.

Metal hydrides include hydrides of alloys of formula $(Ti_{2-x}Zr_xV_{4-y}Ni_y)_{1-z}Cr_z$ where x is from 0 to about 1.5, y is from about 0.6 to about 3.5 and z is <0.2. These alloys are taught for instance in U.S. Pat. No. 4,728,586.

Metal hydrides include hydrides of $LaNi_5$ type alloys, alloys containing Ti and Ni and alloys containing Mg and Ni. Ti and Ni containing alloys may further contain one or more of Zr, V, Cr, Co, Mn, Al, Fe, Mo, La or Mm (mischmetal). Mg and Ni containing alloys may further contain one or more elements selected from Co, Mn, Al, Fe, Cu, Mo, W, Cr, V, Ti, Zr, Sn, Th, Si, Zn, Li, Cd, Na, Pb, La, Mm, Pd, Pt and Ca. Suitable alloys are taught for instance in U.S. Pat. No. 5,554,456.

Mixed metal hydrides are metal hydrides containing more than one metal, for example a metal alloy hydride.

Metal hydrides also include partially discharged metal hydrides; that is metals or alloys containing hydrogen but not containing a full capacity of hydrogen. For example, a partially discharged (or charged) $AB_5H_x$ alloy, where x is less than 6.6. A is a hydride forming element and B is a weak or non-hydride forming element such as $LaNi_5$.

The first and second metal hydrides may be but are not necessarily different metal hydrides. There is a distinct boundary between the main region and secondary region(s). They may for instance have identical metals or alloys and have different levels of hydrogen.

Metals include metals of groups 1 through 16 of the standard periodic table. Included are transition metals, rare earth metals, alkali earth metals, alkali metals, post-transition metals and metalloid metals.

Transition metals include Ti, V, Cr, Mn, Fe, Co, Ni, Cu, Zn, Zr, Hf, W and Pt.

Rare earth metals include Sc, Y, La and the lanthanides.

Alkali earth metals include Be, Mg, Ca and Sr.

Alkali metals include Na, K and Li.

Post-transition metals include Al, Ga, In, Bi and Sn.

Metalloid metals include Ge, As, Sb and Te.

Metal alloys are metal mixtures containing the above metals.

Further metal compounds are metal compounds other than elemental metals, metal alloys and metal hydrides. Included are for example metal oxides, metal halides, metal phosphides, metal nitrides, metal hydroxides, metal oxide/hydroxides, metal sulfides and metal carbides.

Metal oxides are for example oxides including a metal selected from the group consisting of Sb, Ca, Mg, Co, Fe, Pb, Mn, Ag, Cu, Li, K, Na, Al, Cr, Mg, Ni, Pd, Sn, Ti, V, Zn, As, La, Y, Sc, Pr, Nd, Ce, W, Hf, Nb, Sr and Mo. Metal oxides include mixed metal oxides, for instance $FeTiO_3$, $SrTiO_3$, $Y_3Al_5O_{12}$, $Na_2Zn(OH)_4$ and piezoelectric mixed oxides. Mixed metal oxides are metal oxides that contain more than one metal.

Suitable metal oxides include $Sb_2O_4$, $Sb_2O_3$, $Sb_2O_5$, $Co_3O_4$, $Fe_3O_4$, $Pb_3O_4$, $PbO_2$, $PbO$, $Mn_3O_4$, $Ag_2O_2$, $Cu_2O$, $Li_2O$, $K_2O$, $Ag_2O$, $Na_2O$, $AlO$, $CaO$, $CrO$, $CoO$, $CuO$, $FeO$, $MgO$, $NiO$, $PdO$, $SnO$, $TiO$, $VO$, $ZnO$, $MgO$, $Al_2O_3$, $As_2O_3$, $As_2O_5$, $Bi_2O_3$, $Cr_2O_3$, $In_2O_3$, $Fe_2O_3$, $La_2O_3$, $Ni_2O_3$, $Rh_2O_3$, $Ti_2O_3$, $W_2O_3$, $V_2O_3$, $Yb_2O_3$, $Y_2O_3$, $CeO_2$, $CrO_2$, $GeO_2$, $HfO_2$, $PbO_2$, $MnO_2$, $RhO_2$, $SeO_2$, $SnO_2$, $TiO_2$, $WO_2$, $VO_2$, $ZrO_2$, $Nb_2O_5$, $V_2O_5$, $CrO_3$, $MoO_3$, $WO_3$, $Mn_2O_7$, $IrO_4$, $FeTiO_3$, $SrTiO_3$, $Y_3Al_5O_{12}$ and $Na_2Zn(OH)_4$.

Suitable metal halides for instance include a metal selected from the group consisting of Pd, Sn, Fe, Ni, Au, Ag, Ti, Mn, Co, Cu, Be, Mn, V, Zr, Hf, Y, La, Sb, As and Mo.

Suitable metal halides included are $PdCl_2$, $SnCl_4$, $FeCl_3$, $FeBr_3$, $FeF_3$, $FeCl_2$, $FeBr_2$, $FeF_2$, $NiCl_2$, $AuCl_3$, $AgBr$, $TiCl_4$, $MnCl_2$, $CoCl_2$, $CuCl_2$, $CuCl$, $BeF_2$, $MnF_2$, $CoF_2$, $NiF_2$, $CuF_2$, $VF_4$, $ZrF_4$, $HfF_4$, $MnF_4$, $YF_3$, $LaF_3$, $SnF_4$, $MoCl_2$, $MoCl_5$, $SbF_3$, $SbCl_3$, $SbBr_3$, $SbI_3$, $SbF_5$, $SbCl_5$, $AsF_5$ and $MoF_6$.

Metal phosphides for example include a metal selected from the group consisting of Na, K, Ni, Ca, Mg, Al, In, Cu, Zr, Nb, Hf, Mo, W, Fe and Ga. Metal phosphides include mixed metal phosphides. Mixed metal phosphides are metal phosphides containing more than one metal.

Suitable metal phosphides include the nine K phosphides including $K_3P$, $KP$ and $K_3P_7$, $Ni_3P$, $Ni_5P_2$, $Ni_{12}P_5$, $Ni_2P$, $Ni_5P_4$, $NiP$, $NiP_2$, $NiP_3$, $Mg_3P_2$, $Na_3P$, $Ca_3P_2$, $GaP$, $Cu_3P$, $InP$, $AlP$, $Zr_{6.45}Nb_{4.55}P_4$, $Hf_{5.08}Mo_{0.9}P_3$, $MoP$, $WP$, $NiMoP$ and $Fe_2P$.

Metal nitrides include for instance a metal selected from the group consisting of Ti, Zr, W, V, Nb, Al, In, Ga, Fe, Cu, Zn, Cr, Y, Sc, Ba, Sr, Ca, Be, Mg, Gd and Li. Metal nitrides include mixed metal nitrides. Mixed metal nitrides are metal nitrides containing more than one metal.

Suitable metal nitrides include $TiN$, $ZrN$, $Li_3N$, $WN$, $VN$, $Mg_3N_2$, $NbN$, $Be_3N_2$, $AlN$, $InN$, $Ca_3N_2$, $GaN$, $Sr_3N_2$, $Ba_3N_2$, $Fe_2N$, $ScN$, $Cu_3N$, $YN$, $Zn_3N_2$, $Gd_2ScN$ and $CrN$.

Metal hydroxides for example include a metal selected from the group consisting of Al, Be, Co, Cu, Au, Fe, Ni, Sn, Zn, Zr, Ca, La, Ce, Y, Mg, Fe and Ti. Metal hydroxides include mixed metal hydroxides. Mixed metal hydroxides are metal hydroxides containing more than one metal.

Suitable metal hydroxides include $Al(OH)_3$, $Be(OH)_2$, $Co(OH)_2$, $Cu(OH)_2$, $Au(OH)_3$, $Fe(OH)_2$, $Ni(OH)_2$, $Sn(OH)_2$, $Zn(OH)_2$, $Zr(OH)_4$, $Ca(OH)_2$, $La(OH)_3$, $Ce(OH)_4$, $Y(OH)_3$, $Mg(OH)_2$, $Fe(OH)_3$ and $Ti(OH)_4$.

Metal oxide-hydroxides include $AlO(OH)$, $NiO(OH)$ and $FeO(OH)$.

Metal sulfides include for instance a metal selected from the group consisting of Cd, Ag, Pb, Mo, Ni, Sb, Zn, Fe, Cu, As, Al, Sn, Nb, Cs, Ge, Bi, W and Na. Metal sulfides include mixed metal sulfides. Mixed metal sulfides are metal sulfides containing more than one metal.

Suitable metal sulfides include for instance $CdS$, $Ag_2S$, $PbS$, $MoS_2$, $NiS$, $Sb_2S_3$, $ZnS$, $FeS_2$, $Cu_2S$, $CuS$, $As_4S_4$, $AsS$, $Na_2S$, $(Fe,Ni)_9S_8$, $CuFeS_2$, $CuAlS_2$, $CuSnS_3$, $Cu_5FeS_4$, $Cu_5AlS_4$, $MoWS_4$, $SnS$, $Sb_2S_3$, $Bi_2S_3$, $CsSmGeS_4$ and $(Zn,Fe)S$.

Metal carbides for example contain a metal selected from the group consisting of alkali metals, alkali earth metals, transition metals and Group 3 metals. Group 3 metals include Sc, Y and La. Suitable metal carbides include carbides of Sc, Y, La, Al, Mg, Be, Ti, Na, Ca, Cu, Ag, Li, V, Nb, Ta, Cr, Mo, W, Zr, Hf, Fe, Mn, Co and Ni. Metal carbides include methanides, acetylides, sesquicarbides, salt-like carbides, covalent carbides, interstitial carbides, intermediate transition metal carbides and molecular carbides.

The secondary region is dispersed in, dispersed on or coated on the metal hydride main region. The secondary region may be both dispersed in and dispersed on the main region, both dispersed in and coated on the main region, both dispersed on and coated on the main region or may be dispersed in, dispersed on and coated on the main region.

Coated on means a fully continuous or partially continuous (semi-continuous) layer of the secondary region exists on a surface of the main region. A fully continuous coating layer may be envisioned as a core-shell structure with a core main region and a shell secondary region. With a partially continuous layer, the secondary region does not fully encapsulate the main region to form a core-shell structure.

Dispersed on and dispersed in means that the secondary region comprises multiple numerous regions on the surface of the main region or embedded within the main region, respectively. The term "on the surface" includes secondary regions that are partially embedded into the surface of the main region. Numerous means a multiplicity, for instance 2 or more.

The term "secondary region" refers to a coating layer of a secondary region on a main region or may refer to numerous regions dispersed in and/or on a main region. Numerous secondary regions taken together may be considered in total the "secondary region".

The main region and secondary regions are discrete, having a distinct boundary between them.

The second metal hydride may advantageously have a weaker M-H (metal-hydrogen) bond strength then the main region first metal hydride.

The abundance of the main region is equal to or greater than the abundance of the secondary region. Abundance is weight percent (wt %) based on the total metal hydride composition. For instance, the main region is present in an abundance of from about 50 wt % to about 99 wt %, based on the total composition. For example the main region is present from about 60 wt % to about 99 wt %, from about 70 wt % to about 98 wt %, from about 75 wt % to about 98 wt %, from about 80 wt % to about 98 wt % or from about 85 wt % to about 98 wt %, based on the total composition. The main region may be present in an abundance of about 55 wt %, 65 wt %, 90 wt %, 95 wt %, 96 wt % or 97 wt %, based on the total composition.

The secondary region may consist essentially of the one or more additional components selected from the group consisting of second metal hydrides, metals, metal alloys and further metal compounds. The main region may consist essentially of the first metal hydride.

The metal hydride composition may be in particulate form. Particles may be for example platelets, scales, flakes, fibers, spheres, spheroids or other shapes. The particles are for example substantially spherical, for instance micron scaled spheres or spheroids. The average diameter of particulate spheres is for instance from about 0.1 to about 100 microns. The largest radii of platelets or other shapes may also be from about 0.1 to about 100 microns on average. The largest radii is the largest linear measurement.

The metal hydride composition may also be in a bulk form. A bulk form is anything larger than a particulate form. A bulk form is for instance an ingot which may be on the size order of cm, for instance with a length and/or width of about 0.5 cm to about 10 cm, for instance about 1, about 2, about 3, about 4, about 5, about 6, about 7, about 8 or about 9 cm.

For instance, numerous secondary regions are dispersed in a main region in bulk form. Numerous secondary regions may be dispersed on a main region in particle form. A continuous or semi-continuous layer may be coated on a main region in particulate or bulk form.

The numerous secondary regions may for instance be on a scale of from about 3 nm to about 10 microns in diameter on average. For instance, the numerous secondary regions are from about 5 nm to about 7 microns, from about 10 nm to about 5 microns or from about 10 nm to about 3 microns in diameter on average. Diameter refers to the largest linear measure of a discrete secondary region.

The present metal hydride compositions are prepared by various methods.

For instance, powders of the first metal hydride and the one or more additional components are mixed, compacted and annealed. Annealing is performed for example at a temperature of from about 280° C. to about 600° C. for a period of from about 6 hours to about 15 hours. Annealing is performed at an elevated temperature and below the melting temperatures of the first metal hydride and the one or more additional components.

A powder is a particulate.

Alternatively, powders of a metal or alloy capable of forming a first metal hydride and the one or more additional components are mixed, compacted and annealed. Annealing is performed at an elevated temperature and below the melting temperatures of the metal or alloy and the additional components. This is typically followed by hydrogenation to form the first metal hydride.

Alternatively, powders of the first metal hydride or metal or alloy capable of forming a first metal hydride and the one or more additional components are heated together with stirring or mixing above the melting temperature of the first metal hydride or metal or alloy in an inert atmosphere and quenched. This is typically followed by hydrogenation in the case of a metal or alloy capable of forming a first metal hydride.

Quenching methods include melt spinning, single- and double-rod strip casting, centrifugal atomization, gas atomization, water atomization, with proper stirring in the liquid, such as secondary stirring coil, inert gas bubbling, rotating crucible, etc. Combinations of these methods may also be employed.

In another method, powders of the first metal hydride and the one or more additional components are mixed and mechanically alloyed.

Mechanical alloying includes ball milling performed with an attritor. Mechanical alloying is also termed high energy impact ball milling.

Alternatively, powders of a metal or alloy capable of forming a first metal hydride and one or more additional components are mixed and mechanically alloyed. The mixture is hydrogenated before or after mechanical alloying.

In other methods, the one or more additional components are applied to a surface of first metal hydride particles via vapor deposition, electrolytic coating or electrodeless coating.

Alternatively, the one or more additional components are applied to a surface of first metal hydride particles via melt spinning, gas atomization, ultrasonic atomization, centrifugal atomization, planar flow casting, plasma spray or mechanical alloying or combinations thereof. These methods are also suitable for preparing a main first metal hydride region having numerous secondary regions dispersed therein. Applied to a surface means coated on.

The one or more additional components may be applied to a surface of metal or alloy particles capable of forming a first metal hydride, typically followed by hydrogenation.

In other methods, the one or more additional components are applied to a surface of first metal hydride particles via laser ablation, sputtering or vacuum deposition. Such techniques are taught for instance in U.S. Pat. No. 5,554,456 and U.S. Pub. No. 2005/0126663.

For instance, suitable present methods comprise
coating a bulk or particulate first metal hydride with one or more additional components selected from the group consisting of second metal hydrides, metals, metal alloys and further metal compounds;
coating a bulk or particulate metal or alloy capable of forming a first metal hydride with one or more additional components selected from the group consisting of second metal hydrides, metals, metal alloys and further metal compounds and hydrogenation;

coating a bulk or particulate first metal hydride with a metal or alloy capable of forming a second metal hydride and optionally hydrogenation;

coating a bulk or particulate metal or alloy capable of forming a first metal hydride with metal or alloy capable of forming a second metal hydride and hydrogenation;

coating a bulk or particulate metal or alloy capable of forming a first metal hydride with a second metal hydride and hydrogenation;

coating a bulk or particulate first metal hydride with a second metal hydride;

mechanically grinding a metal or alloy capable of forming a first metal hydride together with one or more additional components selected from second metal hydrides, metals, metal alloys and further metal compounds; the particles are then hydrogenated to form first metal hydride particles having numerous metal secondary regions comprising the one or more additional components dispersed therein and/or thereon;

mechanically grinding together of a first metal hydride with one or more additional components selected from second metal hydrides, metals, metal alloys and further metal compounds; this advantageously forms first metal hydride particles with numerous secondary regions comprising the one or more additional components dispersed thereon and/or therein;

mechanically grinding together two or more metals or alloys capable of forming hydrides and hydrogenating to form first metal hydride particles and second metal hydride regions dispersed therein and/or thereon;

mechanically grinding a metal or alloy capable of forming a first metal hydride together with a second metal hydride and hydrogenating to form particles having a main region comprising a first metal hydride and secondary regions comprising a second metal hydride dispersed therein and/or thereon;

mechanically grinding a first metal hydride together with a metal or alloy capable of forming a second metal hydride and optionally hydrogenating to form particles having a main region comprising a first metal hydride and numerous secondary regions dispersed therein and/or thereon;

mechanically grinding a first metal hydride together with a second metal hydride to form particles having a main region comprising a first metal hydride and numerous secondary regions comprising a second metal hydride dispersed therein and/or thereon;

mixing a metal or alloy capable of forming a first metal hydride together with one or more additional components selected from second metal hydrides, metals, metal alloys and further metal compounds; the mixture is melted, cooled to a solid; the solid is mechanically grinded to a powder and is hydrogenated to form first metal hydride particles having numerous secondary regions of the one or more second metal hydrides, metals or metal compounds dispersed therein;

mixing a first metal hydride together with one or more additional components selected from second metal hydrides, metals, metal alloys and further metal compounds; the mixture is melted, cooled to a solid; the solid is mechanically grinded to a powder to form particles comprising a main region comprising the first metal hydride and numerous secondary regions comprising the additional components dispersed therein;

mixing a metal or alloy capable of forming a first metal hydride together with a metal or alloy capable of forming a second metal hydride; the mixture is melted, cooled to a solid; the solid is mechanically grinded to a powder and is hydrogenated to form particles comprising a main region comprising a first metal hydride and numerous secondary regions comprising a second metal hydride and mixing a first metal hydride together with a second metal hydride, melting the mixture, cooling to obtain a solid and mechanically grinding the solid to obtain a powder.

A method to prepare bulk or particulate first metal hydride coated with a secondary region comprising metal or partially discharged metal hydride comprises heating the bulk or particulate first metal hydride and cooling. A surface of the bulk or particulate first metal hydride is fully or partially discharged of hydrogen to form a metal or second metal hydride coating layer. For instance, the bulk or particulate first metal hydride is heated to a temperature of from about 200° C. to about 500° C. and rapidly cooled to about 25° C. The composition may be further subject to mechanical grinding to prepare first metal hydride particles having partially discharged metal hydride regions dispersed thereon and/or therein.

Grinding (mechanical grinding) is a process to pulverize coarse ingot into ca. 200 micron (200 mesh) size. It is typically performed with a jaw crusher and a centrifugal grinding system. It may also be performed with a motorized mortar and pestle or by hand with an agate made mortar and pestle.

Mixing (mechanical mixing) is for instance performed with a ball mill employing chrome steel balls and a powder.

Advantageously, a mixture may be sintered prior to and/or after grinding or mixing. Sintering comprises heating a mixture below the melting temperature of each of the components, for example heating to a temperature of about $\frac{2}{3}$ the melting temperature of the lower melting component. Sintering may be performed in air, under hydrogen, under an inert gas or a vacuum. Sintering may be synonymous with annealing.

The term "metal or alloy capable of forming a metal hydride" means that the metal or alloy is able to absorb hydrogen. When hydrogen is absorbed or "charged" into the metal or alloy it is for example one of the metal hydrides previously described.

The term "melting the mixture" means that at least the first metal hydride or metal or alloy capable of forming the first metal hydride is melted.

Hydrogenation (hydrogenating) is performed for instance under hydrogen gas at a pressure greater than atmospheric. Hydrogen pressure is for instance from about 2 atm to about 20 atm. Hydrogenation may be performed at increased temperature, for instance from about 25° C. to about 500° C.

The secondary region coating formed for example is from about 1 nm to about 1 micron thick. For instance, the coating has an average thickness from about 5 nm to about 500 nm or from about 5 nm to about 400 nm.

Also disclosed is a method for assembling a rechargeable lithium ion cell, comprising providing an anode comprising a present metal hydride composition, providing a cathode, providing an electrolyte and assembling a cell comprising the anode, cathode and electrolyte. The lithium secondary battery according to the present invention may be prepared by inserting an electrode group having a cathode and an anode into a battery case and injecting an electrolyte solution into the case. The battery case may have a metal can shape or a pouch shape made of metal laminate.

Rechargeable lithium ion batteries (cells) comprise an anode, a cathode and a non-aqueous electrolyte solution of a lithium salt in an organic solvent. In the present invention the anode comprises a present metal hydride composition as an anode active material. The electrodes are in contact with the electrolyte and are separated by a separator.

Cathode active materials include one or more compounds selected from the group consisting of lithium cobalt oxide, lithium nickel cobalt manganese oxide (NCM, $LiNi_xMn_yCo_zO_2$), lithium manganese oxide (LMO, $LiMn_2O_4$), lithium nickel oxide and lithium iron phosphate (LFP, $LiFePO_4$).

Anodes of this invention may further contain one or more traditional anode active materials. Traditional anode active materials include carbon and graphitic materials such as natural graphite, artificial graphite, expanded graphite, graphene, carbon fiber, non-graphitizable carbon, carbon black, carbon nano tube, fullerene and activated carbon; metals alloyable with lithium such as Al, Si, Sn, Ag, Bi, Mg, Zn, In, Ge, Pb, Pd, Pt and Ti and compounds including such elements; composite materials of the metals or their compounds and the carbon or graphite materials; and lithium-containing nitrides. For example, crystalline carbon, amorphous carbon, silicon-based active materials, tin-based active materials, silicon-carbon-based active materials and mixtures thereof may be employed as anode active materials.

In addition to the cathode and anode active materials, the electrodes may further include binders and/or conductive materials and/or other additives. The electrode assemblies may include these mixtures in adherence to a current collector such as a metal foil.

The binder assists in coupling the active material and the conductive material and the mixture to the current collector. Binders include poly(tetrafluoroethylene) (PTFE), a copolymer of acrylonitrile and butadiene (NBR), polyvinylidene fluoride (PvDF), polyvinyl alcohol, carboxy methyl cellulose (CMC), starch, hydroxy propyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, copolymers thereof and mixtures thereof. Binders may be employed from about 1 to about 50 weight %, based on the total weight of electrode assembly.

Conductive materials may be from about 1 to about 20 weight %, based on the total weight of the electrode assembly. Conductive materials include graphitic materials such as natural graphite, artificial graphite, a carbon black such as acetylene black, Ketjen black, channel black, furnace black or lamp black, conductive fibers such as carbon fiber or metal fiber, metal powders such as carbon fluoride, aluminum or nickel powder, conductive metal oxides such as zinc oxide, potassium titanate or titan oxide and other conductive materials such as polyphenylene derivatives.

A filler may be employed as a component for controlling expansion of the anode. Fillers include olefin-based polymers such as polyethylene or polypropylene and fibrous material such as glass fiber or carbon fiber.

A separator is interposed between the cathode and the anode which is for instance an insulating thin film ensuring high ion transmission. The separator generally has a pore size of about 0.01 to about 10 microns and a thickness of about 5 to about 300 microns. Separator materials include sheets or non-woven fabrics comprising materials including glass fiber, cotton, nylon, polyester, polyethylene, polypropylene, polyvinyl chloride, polytetrafluoroethylene and kraft paper.

The electrolyte is typically a mixture of organic carbonate solvents selected from for example ethylene carbonate, diethyl carbonate and dimethyl carbonate and containing a lithium salt. Lithium salts are for instance $LiPF_6$, $LiAsF_6$, $LiClO_4$, $LiBF_4$ or $LiCF_3SO_3$. Electrolytes also include solid state electrolytes such as gels, polymers or ceramics. Advantageously, the electrolyte is a liquid solvent.

The lithium secondary battery may for example be a coin-type battery having a cathode, an anode and a single-layer or multi-layer separator or a cylindrical or angled battery having a cathode, an anode and a roll-type separator.

The cathode may be prepared by mixing cathode active material with conductive material and/or a binder and a solvent, coating a metal foil with the mixture and heating and rolling. The anode may be prepared by mixing anode active material with a binder and solvent, coating a metal foil with the mixture and heating and rolling.

The terms "a" or "an" referring to elements of an embodiment may mean "one" or may mean "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

The term "consisting essentially of" means that the composition, method or structure may include additional ingredients, steps and/or parts, but only if the additional ingredients, steps and/or parts do not materially alter the basic and novel characteristics of the claimed composition, method or structure.

U.S. patents, U.S. published patent applications and U.S. patent applications discussed herein are each hereby incorporated by reference.

Following are some embodiments of the invention.

E1. A metal hydride composition comprising a main region comprising a first metal hydride and a secondary region comprising one or more additional components selected from the group consisting of second metal hydrides, metals, metal alloys and further metal compounds.

E2. A composition according to embodiment 1 where the secondary region comprises one or more second metal hydrides.

E3. A composition according to embodiment 2 where the first and second metal hydrides are selected from the group consisting of transition metal hydrides, rare earth metal hydrides, alkaline earth metal hydrides, alkali metal hydrides and mixed metal hydrides.

E4. A composition according to embodiment 2 where the first and second metal hydrides are selected from the group consisting of $MgH_2$, $NaH$, $TiH_2$, $LaNi_5H_5$, $LaNi_5H_6$, $LaNi_5H_7$, $Mg_2NiH_4$, $NiH$, $ZrH_2$, $NaAlH_4$, $Li_3AlH_6$, $LiAlH_4$, $LiH$, $PdH$, $ZnMn_2H_3$, $CaH_2$, $YH_2$, $LiMg(AlH_4)_3$, $LiMgAlH_6$, $V_2H$, $VH$, $FeTiH$, $FeTiH_2$, $ZrH_2$; hydrides of $LaNi_{4.5}Al_{0.5}$, $La_2Co_1Ni_9$, $MmNi_5$, $TiMn_2$, $YNi_5$, $Zr_4Sc_1Fe_{10}$, $ZrMn_2La_{0.8}Nd_{0.2}Ni_2Co_3$, $Ti_{0.5}Zr_{0.5}Fe_{0.5}Ni_{0.5}V_{0.7}$, $MmNi_{3.7}Mn_{0.4}Al_{0.3}Co_{0.6}$, MmNi$_{3.55}$Mn$_{0.2}$Al$_{0.3}$Co$_{0.75}$, Zr$_{0.5}$Ti$_{0.5}$V$_{0.76}$Ni$_{1.48}$Fe$_{0.04}$, Ti$_{0.5}$Zr$_{0.5}$Mo$_{0.2}$CeNi$_{1.2}$V$_{1.8}$, Zr$_{0.9}$Al$_{0.1}$Mn$_{0.5}$Cr$_{0.3}$Ni$_{1.2}$, Ti$_{0.3}$Zr$_{1.0}$Ni$_{1.4}$Cr$_{0.3}$ or Ti$_{0.3}$Cr$_{0.3}$Zr$_{0.5}$Ni$_{0.7}$V$_{1.2}$Cu$_{0.1}$ and hydrides of alloys containing Ti and Mn, Ti, V and Mn, Ti, V and Fe or Ti, V and Ni; for instance hydrides of Ti—Zr—Mn—Cr—V, Ti—Zr—Mn—Cr—Fe, Ti—Zr—Mn—V—Mo, Ti—V—Ni, Ti—V—Ni—Zr, Ti—V—Ni—Zr, Ti—V—Ni—Cr, Ti—V—Ni—Al or Ti—V—Zr—Ni—Cr alloys.

E5. A composition according to any of the preceding embodiments where the second metal hydride has a weaker M-H (metal-hydrogen) bond strength than the first metal hydride.

E6. A composition according to embodiment 1 where the secondary region comprises one or more additional components selected from the group consisting of metals and metal alloys.

E7. A composition according to embodiment 6 where the one or more metals and alloys are selected from the group consisting of transition metals, rare earth metals, alkali earth metals, alkali metals, post-transition metals, metalloid metals and alloys thereof.

E8. A composition according to embodiment 6 where the one or more metals and alloys are selected from the group consisting of Ti, V, Cr, Mn, Fe, Co, Ni, Cu, Zn, Zr, Hf, W, Pt, Sc, Y, La, lanthanides, Be, Mg, Ca, Sr, Na, K, Li, Al, Ga, In, Bi, Sn, Ge, As, Sb, Te and alloys thereof.

E9. A composition according to embodiment 1 where the secondary region comprises one or more further metal compounds.

E10. A composition according to embodiment 9 where the one or more further metal compounds are selected from the group consisting of metal oxides, metal halides, metal phosphides, metal nitrides, metal hydroxides, metal oxide/hydroxides, metal sulfides and metal carbides.

E11. A composition according to embodiment 9 where the one or more further metal compounds are selected from the group consisting of metal oxides.

E12. A composition according to embodiment 11 where the metal oxides are oxides of one or more metals selected from the group consisting of Sb, Ca, Mg, Co, Fe, Pb, Mn, Ag, Cu, Li, K, Na, Al, Cr, Mg, Ni, Pd, Sn, Ti, V, Zn, As, La, Y, Sc, Pr, Nd, Ce, W, Hf, Nb, Sr and Mo.

E13. A composition according to embodiment 11 where the metal oxides are selected from the group consisting of Sb$_2$O$_4$, Sb$_2$O$_3$, Sb$_2$O$_5$, Co$_3$O$_4$, Fe$_3$O$_4$, Pb$_3$O$_4$, PbO$_2$, PbO, Mn$_3$O$_4$, Ag$_2$O$_2$, Cu$_2$O, Li$_2$O, K$_2$O, Ag$_2$O, Na$_2$O, AlO, CaO, CrO, CoO, CuO, FeO, MgO, NiO, PdO, SnO, TiO, VO, ZnO, MgO, Al$_2$O$_3$, As$_2$O$_3$, As$_2$O$_5$, Bi$_2$O$_3$, Cr$_2$O$_3$, In$_2$O$_3$, Fe$_2$O$_3$, La$_2$O$_3$, Ni$_2$O$_3$, Rh$_2$O$_3$, Ti$_2$O$_3$, W$_2$O$_3$, V$_{2O3}$, Yb$_2$O$_3$, Y$_2$O$_3$, CeO$_2$, CrO$_2$, GeO$_2$, HfO$_2$, PbO$_2$, MnO$_2$, RhO$_2$, SeO$_2$, SnO$_2$, TiO$_2$, WO$_2$, VO$_2$, ZrO$_2$, Nb$_2$O$_5$, V$_2$O$_5$, CrO$_3$, MoO$_3$, WO$_3$, Mn$_2$O$_7$, IrO$_4$, FeTiO$_3$, SrTiO$_3$, Y$_3$Al$_5$O$_{12}$ and Na$_2$Zn(OH)$_4$.

E14. A composition according to embodiment 9 where the one or more further metal compounds are selected from the group consisting of metal halides.

E15. A composition according to embodiment 14 where the metal halides are halides of one or more metals selected from the group consisting of Pd, Sn, Fe, Ni, Au, Ag, Ti, Mn, Co, Cu, Be, Mn, V, Zr, Hf, Y, La, Sb, As and Mo.

E16. A composition according to embodiment 14 where the metal halides are selected from the group consisting of PdCl$_2$, SnCl$_4$, FeCl$_3$, FeBr$_2$, FeF$_3$, FeCl$_2$, FeBr$_2$, FeF$_2$, NiCl$_2$, AuCl$_3$, AgBr, TiCl$_4$, MnCl$_2$, CoCl$_2$, CuCl$_2$, CuCl, BeF$_2$, MnF$_2$, CoF$_2$, NiF$_2$, CuF$_2$, VF$_4$, ZrF$_4$, HfF$_4$, MnF$_4$, YF$_3$, LaF$_3$, SnF$_4$, MoCl$_2$, MoCl$_5$, SbF$_3$, SbCl$_3$, SbBr$_3$, SbI$_3$, SbF$_5$, SbCl$_5$, AsF$_5$ and MoF$_6$.

E17. A composition according to embodiment 9 where the one or more further metal compounds are selected from the group consisting of metal phosphides.

E18. A composition according to embodiment 17 where the metal phosphides are phosphides of one or more metals selected from the group consisting of Na, K, Ni, Ca, Mg, Al, In, Cu, Zr, Nb, Hf, Mo, W, Fe and Ga.

E19. A composition according to embodiment 17 where the metal phosphides are selected from the group consisting of the nine K phosphides including K$_3$P, KP and K$_3$P$_7$, Ni$_3$P, Ni$_5$P$_2$, Ni$_{12}$P$_5$, Ni$_2$P, Ni$_5$P$_4$, NiP, NiP$_2$, NiP$_3$, Mg$_3$P$_2$, Na$_3$P, Ca$_3$P$_2$, GaP, Cu$_3$P, InP, AlP, Zr$_{6.45}$Nb$_{4.55}$P$_4$, Hf$_{5.08}$Mo$_{0.9}$P$_3$, MoP, WP, NiMoP and Fe$_2$P.

E20. A composition according to embodiment 9 where the one or more further metal compounds selected from the group consisting of metal nitrides.

E21. A composition according to embodiment 20 where the metal nitrides are nitrides of one or more metals selected from the group consisting of Ti, Zr, W, V, Nb, Al, In, Ga, Fe, Cu, Zn, Cr, Y, Sc, Ba, Sr, Ca, Be, Mg, Gd and Li.

E22. A composition according to embodiment 20 where the metal nitrides are selected from the group consisting of TiN, ZrN, Li$_3$N, WN, VN, Mg$_3$N$_2$, NbN, Be$_3$N$_2$, AlN, InN, Ca$_3$N$_2$, GaN, Sr$_3$N$_2$, Ba$_3$N$_2$, Fe$_2$N, ScN, Cu$_3$N, YN, Zn$_3$N$_2$, Gd$_2$ScN and CrN.

E23. A composition according to embodiment 9 where the one or more further metal compounds are selected from the group consisting of metal hydroxides.

E24. A composition according to embodiment 23 where the metal hydroxides are hydroxides of one or more metals selected from the group consisting of Al, Be, Co, Cu, Au, Fe, Ni, Sn, Zn, Zr, Ca, La, Ce, Y, Mg, Fe and Ti.

E25. A composition according to embodiment 23 where the metal hydroxides are selected from the group consisting of Al(OH)$_3$, Be(OH)$_2$, Co(OH)$_2$, Cu(OH)$_2$, Au(OH)$_3$, Fe(OH)$_2$, Ni(OH)$_2$, Sn(OH)$_2$, Zn(OH)$_2$, Zr(OH)$_4$, Ca(OH)$_2$, La(OH)$_3$, Ce(OH)$_4$, Y(OH)$_3$, Mg(OH)$_2$, Fe(OH)$_3$ and Ti(OH)$_4$.

E26. A composition according to embodiment 9 where the one or more further metal compounds are selected from the group consisting of metal oxide/hydroxides.

E27. A composition according to embodiment 26 where the metal oxide/hydroxides are selected from the group consisting of AlO(OH), NiO(OH) and FeO(OH).

E28. A composition according to embodiment 9 where the one or more further metal compounds are selected from the group consisting of metal sulfides.

E29. A composition according to embodiment 28 where the metal sulfides are sulfides of one or more metals selected from the group consisting of Cd, Ag, Pb, Mo, Ni, Sb, Zn, Fe, Cu, As, Al, Sn, Nb, Cs, Ge, Bi, W and Na.

E30. A composition according to embodiment 28 where the metal sulfides are selected from the group consisting of CdS, Ag$_2$S, PbS, MoS$_2$, NiS, Sb$_2$S$_3$, ZnS, FeS$_2$, Cu$_2$S, CuS, As$_4$S$_4$, AsS, Na$_2$S, (Fe,Ni)$_9$S$_8$, CuFeS$_2$, CuAlS$_2$, CuSnS$_3$, Cu$_5$FeS$_4$, Cu$_5$AlS$_4$, MoWS$_4$, SnS, Sb$_2$S$_3$, Bi$_2$S$_3$, CsSmGeS$_4$ and (Zn,Fe)S.

E31. A composition according to embodiment 9 where the one or more further metal compounds are selected from the group consisting of metal carbides.

E32. A composition according to embodiment 31 where the metal carbides are carbides of one or more metals selected from the group consisting of alkali metals, alkali earth metals, transition metals and Group 3 metals.

E33. A composition according to embodiment 31 where the metal carbides are selected from the group consisting of Sc, Y, La, Al, Mg, Be, Ti, Na, Ca, Cu, Ag, Li, V, Nb, Ta, Cr, Mo, W, Zr, Hf, Fe, Mn, Co and Ni carbides.

E34. A composition according to any of the preceding embodiments where the first metal hydride is $MgH_2$.

E35. A composition according to any of the preceding embodiments where the main region consists essentially of the first metal hydride; for example $MgH_2$.

E36. A composition according to any of the preceding embodiments where the secondary region consists essentially of the one or more additional components.

E37. A composition according to any of the preceding embodiments where the abundance of the main region is equal to or greater than the abundance of the secondary region by weight, for instance, the main region is present in an abundance of from about 50 wt % to about 99 wt %, from about 60 wt % to about 99 wt %, from about 70 wt % to about 98 wt %, from about 75 wt % to about 98 wt %, from about 80 wt % to about 98 wt % or from about 85 wt % to about 98 wt %, based on the total composition.

E38. A composition according to any of the preceding embodiments which is in particulate form.

E39. A composition according to embodiment 38 where the particles are spheres with an average diameter of from about 0.1 micron to about 100 microns or are platelets, scales, flakes, fibers or spheroids with an average largest radii of from about 0.1 micron to about 100 microns.

E40. A composition according to any of embodiments 1 to 37 which is in bulk form.

E41. A composition according to embodiment 40 where the bulk form has a length and/or width of from about 0.5 cm to about 10 cm, for instance about 1, about 2, about 3, about 4, about 5, about 6, about 7, about 8 or about 9 cm.

E42. A composition according to any of the preceding embodiments where the secondary region is dispersed in, dispersed on, coated on, dispersed in and dispersed on, dispersed in and coated on, dispersed on and coated on or dispersed in, dispersed on and coated on the main region.

E43. A composition according to embodiment 42 where the secondary region is coated on the main region and is in the form of a fully continuous or a partially continuous coating layer on the main region.

E44. A composition according to embodiment 43 where the secondary region is coated on a main region, which main region is in bulk or particulate form.

E45. A composition according to embodiment 44 where the coating has an average thickness from about 1 nm to about 1 micron thick, from about 5 nm to about 500 nm thick or from about 5 nm to about 400 nm thick.

E46. A composition according to embodiment 42 where the secondary region is dispersed in the main region.

E47. A composition according to embodiment 46 where the main region is in bulk form.

E48. A composition according to embodiment 42 where the secondary region is dispersed on the main region.

E49. A composition according to embodiment 48 where the main region is in particulate form.

E50. A composition according to any of the preceding embodiments where the secondary region comprises numerous regions with an average diameter of from about 3 nm to about 10 microns, from about 5 nm to about 7 microns, from about 10 nm to about 5 microns or from about 10 nm to about 3 microns.

E51. A method for preparing a composition according to any of embodiments 42 to 45, the method comprising coating a bulk or particulate first metal hydride with one or more additional components selected from the group consisting of second metal hydrides, metals, metal alloys and further metal compounds.

E52. A method for preparing a composition according to any of embodiments 42 to 45, the method comprising coating a bulk or particulate metal or alloy capable of forming a first metal hydride with one or more additional components selected from the group consisting of second metal hydrides, metals, metal alloys and further metal compounds and hydrogenation.

E53. A method for preparing a composition according to any of embodiments 42 to 45, the method comprising coating a bulk or particulate first metal hydride with a metal or alloy capable of forming a second metal hydride and optionally hydrogenation.

E54. A method for preparing a composition according to any of embodiments 42 to 45, the method comprising coating a bulk or particulate metal or alloy capable of forming a first metal hydride with metal or alloy capable of forming a second metal hydride and hydrogenation.

E55. A method for preparing a composition according to any of embodiments 42 to 45, the method comprising coating a bulk or particulate metal or alloy capable of forming a first metal hydride with a second metal hydride and hydrogenation.

E56. A method for preparing a composition according to any of embodiments 42 to 45, the method comprising coating a bulk or particulate first metal hydride with a second metal hydride.

E57. A method for preparing a composition according to any of embodiments 42 and 46 to 50, the method comprising mechanically grinding a first metal hydride together with one or more additional components selected from second metal hydrides, metals, metal alloys and further metal compounds.

E58. A method for preparing a composition according to any of embodiments 42 and 46 to 50, the method comprising mechanically grinding a metal or alloy capable of forming a first metal hydride together with one or more additional components selected from second metal hydrides, metals, metal alloys and further metal compounds and hydrogenation.

E59. A method for preparing a composition according to any of embodiments 42 and 46 to 50, the method comprising mechanically grinding a first metal hydride together with a metal or alloy capable of forming a second metal hydride and optionally hydrogenation.

E60. A method for preparing a composition according to any of embodiments 42 and 46 to 50, the method comprising mechanically grinding together a metal or alloy capable of forming a first metal hydride with a metal or alloy capable of forming a second metal hydride and hydrogenation.

E61. A method for preparing a composition according to any of embodiments 42 and 46 to 50, the method comprising mechanically grinding a metal or alloy capable of forming a first metal hydride together with a second metal hydride and hydrogenation.

E62. A method for preparing a composition according to any of embodiments 42 and 46 to 50, the method comprising mechanically grinding a first metal hydride together with a second metal hydride.

E63. A method for preparing a composition according to any of embodiments 42 and 46 to 50, the method comprising mixing a first metal hydride together with one or more additional components selected from second metal hydrides, metals, metal alloys and further metal compounds, melting the mixture, cooling to obtain a solid and mechanically grinding the solid to obtain a powder.

E64. A method for preparing a composition according to any of embodiments 42 and 46 to 50, the method comprising mixing a metal or alloy capable of forming a first metal hydride together with one or more additional components selected from second metal hydrides, metals, metal alloys and further metal compounds, melting the mixture, cooling to a obtain a solid, mechanically grinding the solid to obtain a powder and hydrogenation.

E65. A method for preparing a composition according to any of embodiments 42 and 46 to 50, the method comprising mixing a first metal hydride together with a metal or alloy capable of forming a second metal hydride, melting the mixture, cooling to obtain a solid, mechanically grinding the solid to obtain a powder and optionally hydrogenation.

E66. A method for preparing a composition according to any of embodiments 42 and 46 to 50, the method comprising mixing a metal or alloy capable of forming a first metal hydride together with a metal or alloy capable of forming a second metal hydride, melting the mixture, cooling to obtain a solid, mechanically grinding the solid to obtain a powder and hydrogenation.

E67. A method for preparing a composition according to any of embodiments 42 and 46 to 50, the method comprising mixing a metal or alloy capable of forming a first metal hydride together with a second metal hydride, melting the mixture, cooling to obtain a solid, mechanically grinding the solid to obtain a powder and hydrogenation.

E68. A method for preparing a composition according to any of embodiments 42 and 46 to 50, the method comprising mixing a first metal hydride together with a second metal hydride, melting the mixture, cooling to obtain a solid and mechanically grinding the solid to obtain a powder.

E69. A method for preparing a composition according to any of embodiments 42 to 45 comprising heating a first metal hydride, cooling and optionally mechanical grinding.

E70. A metal hydride composition prepared according to any of embodiments 51 to 69.

E71. A rechargeable lithium ion cell comprising an anode, a cathode and an electrolyte, where the anode comprises a metal hydride composition according to any of embodiments 1 to 50 and 70.

E72. Use of composition according to any of embodiments 1 to 50 and 70 in an electrode of a rechargeable lithium ion battery.

Example 1

A Mg hydride ingot is heated in a quartz lamp heated chamber under a reducing atmosphere to 400° C. for several seconds and allowed to cool. The surface is partially discharged (discharged of hydrogen). A first metal hydride $MgH_2$ is encapsulated with partially discharged magnesium hydride. The composition may be further subject to mechanical grinding to prepare $MgH_2$ particles having partially discharged $MgH_2$ dispersed thereon and/or therein.

Example 2

$MgH_2$ is coated with $LaNi_5$ via laser ablation. This is followed by hydrogenation under 10 atm of $H_2$ at 30° C. This results in $MgH_2$ coated with $LaNi_5H_6$. The M-H (metal-hydrogen) bond strength of $MgH_2$ is stronger than that of $LaNi_5H_6$.

Example 3

A composition is prepared via sintering a mixture of Mg and Fe, grinding to a fine powder and full hydrogenation under 10 atm of $H_2$ at 400° C. This results in $MgH_2$ comprising numerous secondary regions of Fe dispersed therein.

Example 4

A coarse powder of $MgH_2$ is mechanically grinded together with a fine powder of Fe. The Fe powder particles have an average diameter of <1 micron. This results in $MgH_2$ with numerous secondary regions of Fe dispersed thereon.

Example 5

Coarse Mg powder is mixed with $LaNi_5$ fine powder followed by sintering. The mixture is grinded and fully hydrogenated under 10 atm of $H_2$ while cooling from 400° C. to room temperature. This results in $MgH_2$ with numerous secondary regions of $LaNi_5H_6$ dispersed therein.

Example 6

Coarse Mg powder is mixed with $LaNi_5$ fine powder. The mixture is grinded and fully hydrogenated under 10 atm of $H_2$ while cooling from 400° C. to room temperature. This results in $MgH_2$ with numerous secondary regions of $LaNi_5H_6$ dispersed thereon.

Example 7

La and Ni and a certain weight % of $La_2O_3$ fine powder (particles with average diameter<1 micron) are melted in an induction furnace. The stirred liquid is quickly poured into a mold to freeze the location of $La_2O_3$ in the ingot. The ingot is grinded into powder and fully hydrogenated under 10 atm of $H_2$ at 30° C. This results in $LaNi_5H_6$ with numerous secondary regions of $La_2O_3$ dispersed therein.

The invention claimed is:

1. A rechargeable lithium ion cell comprising an anode, a cathode and an electrolyte,
   wherein the anode comprises a metal hydride composition comprising
   a main region comprising a first metal hydride and a secondary region comprising one or more additional components selected from the group consisting of second metal hydrides, metals, metal alloys and further metal compounds and
   wherein the abundance of the main region is from about 50 wt % to about 99 wt %, based on the total metal hydride composition.

2. A cell according to claim 1, wherein the metal hydride composition comprises a secondary region comprising one or more second metal hydrides selected from the group consisting of transition metal hydrides, rare earth metal hydrides, alkaline earth metal hydrides, alkali metal hydrides and mixed metal hydrides.

3. A cell according to claim 2, wherein the secondary region comprises one or more second metal hydrides selected from the group consisting of $MgH_2$, NaH, $TiH_2$, $LaNi_5H_5$, $LaNi_5H_6$, $LaNi_5H_7$, $Mg_2NiH_4$, NiH, $ZrH_2$, $NaAlH_4$, $Li_3AlH_6$, $LiAlH_4$, LiH, PdH, $ZnMn_2H_3$, $CaH_2$, $YH_2$, $LiMg(AlH_4)_3$, $LiMgAlH_6$, $V_2H$, VH, FeTiH, $FeTiH_2$, $ZrH_2$; hydrides of $LaNi_{4.5}Al_{0.5}$, $La_2Co_1Ni_9$, $MmNi_5$, $TiMn_2$, $YNi_5$, $Zr_4Sc_1Fe_{10}$, $ZrMn_2La_{0.8}Nd_{0.2}Ni_2Co_3$, $Ti_{0.5}Zr_{0.5}Fe_{0.5}Ni_{0.5}V_{0.7}$, $MmNi_{3.7}Mn_{0.4}Al_{0.3}Co_{0.6}$, $MmNi_{3.55}Mn_{0.2}Al_{0.3}Co_{0.75}$, $Zr_{0.5}Ti_{0.5}V_{0.76}Ni_{1.48}Fe_{0.04}$, $Ti_{0.5}Zr_{0.5}Mo_{0.2}CeNi_{1.2}V_{1.8}$, $Zr_{0.9}Al_{0.1}Mn_{0.5}Cr_{0.3}Ni_{1.2}$, $Ti_{0.3}Zr_{1.0}Ni_{1.4}Cr_{0.3}$ or $Ti_{0.3}Cr_{0.3}Zr_{0.5}Ni_{0.7}V_{1.2}Cu_{0.1}$ and hydrides of alloys containing Ti and Mn, Ti, V and Mn, Ti, V and Fe or Ti, V and Ni.

4. A cell according to claim 2, wherein the second metal hydride has a weaker metal-hydrogen bond strength than the first metal hydride.

5. A cell according to claim 1, wherein the metal hydride composition comprises a secondary region which comprises one or more metals and/or metal alloys selected from the group consisting of Ti, V, Cr, Mn, Fe, Co, Ni, Cu, Zn, Zr, Hf, W, Pt, Sc, Y, La, lanthanides, Be, Mg, Ca, Sr, Na, K, Li, Al, Ga, In, Bi, Sn, Ge, As, Sb, Te and alloys thereof.

6. A cell according to claim 1, wherein the metal hydride composition comprises a secondary region which comprises one or more metal compounds selected from the group consisting of metal oxides, metal halides, metal phosphides, metal nitrides, metal hydroxides, metal oxide/hydroxides, metal sulfides and metal carbides.

7. A cell according to claim 1, wherein the metal hydride composition comprises a secondary region which comprises one or more metal compounds selected from the group consisting of oxides of one or more metals selected from the group consisting of Sb, Ca, Mg, Co, Fe, Pb, Mn, Ag, Cu, Li, K, Na, Al, Cr, Mg, Ni, Pd, Sn, Ti, V, Zn, As, La, Y, Sc, Pr, Nd, Ce, W, Hf, Nb, Sr and Mo.

8. A cell according to claim 1, wherein the metal hydride composition comprises a secondary region which comprises one or more metal compounds selected from the group consisting of
  halides of one or more metals selected from the group consisting of Pd, Sn, Fe, Ni, Au, Ag, Ti, Mn, Co, Cu, Be, Mn, V, Zr, Hf, Y, La, Sb, As and Mo;
  phosphides of one or more metals selected from the group consisting of Na, K, Ni, Ca, Mg, Al, In, Cu, Zr, Nb, Hf, Mo, W, Fe and Ga;
  nitrides of one or more metals selected from the group consisting of Ti, Zr, W, V, Nb, Al, In, Ga, Fe, Cu, Zn, Cr, Y, Sc, Ba, Sr, Ca, Be, Mg, Gd and Li;
  sulfides of one or more metals selected from the group consisting of Cd, Ag, Pb, Mo, Ni, Sb, Zn, Fe, Cu, As, Al, Sn, Nb, Cs, Ge, Bi, W and Na; and
  carbides of one or more metals selected from the group consisting of Sc, Y, La, Al, Mg, Be, Ti, Na, Ca, Cu, Ag, Li, V, Nb, Ta, Cr, Mo, W, Zr, Hf, Fe, Mn, Co and Ni.

9. A cell according to claim 1, wherein the metal hydride composition comprises a secondary region which comprises one or more metal compounds selected from the group consisting of
  hydroxides of one or more metals selected from the group consisting of Al, Be, Co, Cu, Au, Fe, Ni, Sn, Zn, Zr, Ca, La, Ce, Y, Mg, Fe and Ti;
  and
  metal oxide/hydroxides.

10. A cell according to claim 1, wherein the first metal hydride is $MgH_2$.

11. A cell according to claim 1, wherein the main region consists essentially of the first metal hydride and/or the secondary region consists essentially of the one or more additional components.

12. A cell according to claim 2, wherein the first metal hydride is $MgH_2$.

13. A cell according to claim 1, wherein the metal hydride composition is in particulate form wherein the particles are spheres with an average diameter of from about 0.1 micron to about 100 microns or are platelets, scales, flakes, fibers or spheroids with an average largest radii of from about 0.1 micron to about 100 microns.

14. A cell according to claim 1, wherein the metal hydride composition is in bulk form.

15. A cell according to claim 1, wherein the metal hydride composition comprises a secondary region dispersed in, dispersed on, coated on, dispersed in and dispersed on, dispersed in and coated on, dispersed on and coated on or dispersed in, dispersed on and coated on the main region.

16. A cell according to claim 15, wherein the metal hydride composition comprises a secondary region in the form of a fully continuous or a partially continuous coating layer on the main region, which main region is in bulk or particulate form.

17. A cell according to claim 16, wherein the coating layer has an average thickness from about 1 nm to about 1 micron thick.

18. A cell according to claim 15, wherein the secondary region is dispersed in the main region.

19. A cell according to claim 18, wherein the main region is in bulk form.

20. A cell according to claim 15, wherein the secondary region is dispersed on the main region.

21. A cell according to claim 20, wherein the main region is in particulate form.

22. A cell according to claim 1, wherein the metal hydride composition comprises a secondary region comprising numerous regions with an average diameter of from about 3 nm to about 10 microns.

23. A rechargeable lithium ion cell comprising an anode, a cathode and an electrolyte,
  wherein the anode comprises a metal hydride composition comprising
  a main region comprising a first metal hydride and a secondary region comprising one or more additional components selected from the group consisting of second metal hydrides, metals, metal alloys and further metal compounds,
  wherein the metal hydride composition comprises a secondary region in the form of a fully continuous or a partially continuous coating layer on the main region, which main region is in bulk or particulate form and
  wherein the coating layer has an average thickness from about 1 nm to about 1 micron thick.

* * * * *